United States Patent
Halligan (10) Patent No.: US 11,412,407 B2
(45) Date of Patent: Aug. 9, 2022

(54) SIGNALLING CONGESTION STATUS

(71) Applicant: Openwave Mobility Inc., Redwood City, CA (US)

(72) Inventor: Matt Halligan, Redwood City, CA (US)

(73) Assignee: Openwave Mobility Inc., Redwood City, CA (US)

( * ) Notice: Subject to any disclaimer, the term of this patent is extended or adjusted under 35 U.S.C. 154(b) by 0 days.

(21) Appl. No.: 16/265,805

(22) Filed: Feb. 1, 2019

(65) Prior Publication Data
US 2019/0239115 A1  Aug. 1, 2019

(30) Foreign Application Priority Data

Feb. 1, 2018  (GB) .................................. 1801658.4

(51) Int. Cl.
*H04W 28/02* (2009.01)
*H04L 47/11* (2022.01)
(Continued)

(52) U.S. Cl.
CPC ......... *H04W 28/0284* (2013.01); *H04L 47/11* (2013.01); *H04L 47/115* (2013.01);
(Continued)

(58) Field of Classification Search
CPC ............. H04W 28/0284; H04W 24/08; H04W 28/0289; H04W 28/10; H04L 47/115;
(Continued)

(56) References Cited

U.S. PATENT DOCUMENTS

2004/0052212 A1  3/2004  Baillargeon
2005/0047340 A1*  3/2005  Babiarz .................. H04L 47/31
                                                                370/231
(Continued)

FOREIGN PATENT DOCUMENTS

EP    2219343 A1 *  8/2010  ........... H04L 47/122
EP    3120512 A1    2/2019
(Continued)

OTHER PUBLICATIONS

Extended European Search Report dated May 2, 2019 for Application No. 19154694.4.
(Continued)

*Primary Examiner* — Jeffrey M Rutkowski
*Assistant Examiner* — Chae S Lee
(74) *Attorney, Agent, or Firm* — EIP US LLP (57) ABSTRACT

There is described an apparatus for a base station in a radio access network. The apparatus is configured to detect a change in a radio network congestion status associated with a cell or cell sector of the base station that is being used to serve a mobile device, the change being a change to a given one of a plurality of possible radio congestion levels. The apparatus starts a packet modification process to modify one or more packets in each of one or more uplink data flows from the mobile device to a core network of the radio access network, the one or more packets in each of the one or more uplink data flows being modified by the packet modification process to signal, to a server in the core network, the change in congestion status to the given one of the plurality of possible radio congestion levels.

16 Claims, 7 Drawing Sheets

(51) Int. Cl.
  *H04L 47/33* (2022.01)
  *H04L 47/31* (2022.01)
  *H04L 47/12* (2022.01)
  *H04W 24/08* (2009.01)
  *H04W 28/10* (2009.01)
(52) U.S. Cl.
  CPC .............. *H04L 47/12* (2013.01); *H04L 47/31* (2013.01); *H04L 47/33* (2013.01); *H04W 24/08* (2013.01); *H04W 28/0289* (2013.01); *H04W 28/10* (2013.01)
(58) Field of Classification Search
  CPC ......... H04L 47/33; H04L 47/31; H04L 47/11; H04L 47/12
  See application file for complete search history.

(56) References Cited

U.S. PATENT DOCUMENTS

| | | | | |
|---|---|---|---|---|
| 2006/0092836 | A1* | 5/2006 | Kwan | H04L 47/283 370/229 |
| 2007/0036079 | A1* | 2/2007 | Chowdury | H04W 28/0284 370/235 |
| 2009/0285099 | A1 | 11/2009 | Kahn et al. | |
| 2010/0034090 | A1* | 2/2010 | Bader | H04L 47/11 370/236 |
| 2012/0051216 | A1 | 3/2012 | Zhang et al. | |
| 2012/0120798 | A1* | 5/2012 | Jacquet | H04L 47/12 370/230 |
| 2014/0133296 | A1 | 5/2014 | Johansson | |
| 2014/0321289 | A1* | 10/2014 | Liu | H04L 47/31 370/237 |
| 2015/0003280 | A1* | 1/2015 | Colban | H04W 28/0252 370/253 |
| 2015/0016247 | A1* | 1/2015 | Hayes | H04L 47/127 370/230 |
| 2016/0050653 | A1 | 2/2016 | Rastogi | |
| 2016/0359750 | A1* | 12/2016 | Miklos | H04L 47/24 |

FOREIGN PATENT DOCUMENTS

| | | |
|---|---|---|
| GB | 2 219 343 A1 * | 8/2010 |
| WO | 2012082036 A1 | 6/2012 |

OTHER PUBLICATIONS

Combined Search and Examination Report dated Jun. 27, 2018 for GB1801658.4.
TCP Optimization, picture under "Efficient Network Utilization" heading.
Combined Search and Exam Report dated Apr. 19, 2021 for Application No. GB2102943.4.

* cited by examiner

◄——— Moving Window Length ———►

| Con States | T1 | T2 | T3 | T4 | T5 | Aggregate |
|---|---|---|---|---|---|---|
| None | 0 | 0 | 0 | 0 | 0 | 0 |
| Low | 0 | 0 | 0 | 0 | 0 | 0 |
| Medium | 0 | 1 | 1 | 0 | 0 | 2 |
| High | 5 | 7 | 6 | 6 | 6 | 30 |

SIGNALLING CONGESTION STATUS

CROSS-REFERENCE TO RELATED APPLICATIONS

The application claims the benefit under 35 U.S.C. § 119(a) and 37 CFR § 1.55 to GB patent application no. 1801658.4, filed on Feb. 1, 2018, the entire content of which is incorporated herein by reference.

BACKGROUND OF THE INVENTION

Technical Field

The present invention relates to signalling a change in congestion status in a network. In particular, the present application relates to signalling a change in congestion status between a base station and a gateway element in a cellular network.

Description of the Related Technology

Network elements, such as switches and routers, in a TCP/IP based network may respond to network congestion by dropping TCP/IP packets in a packet flow to signal the occurrence of network congestion to a sending device. The sending device may respond to the dropped packets by reducing its packet transmission rate to alleviate or relieve the network congestion. However, this method of congestion notification and management is associated with several disadvantages, including the need to retransmit dropped packets and inefficient utilization of network bandwidth.

Explicit Congestion Notification (ECN) provides an alternative to packet drop based congestion control by facilitating end-to-end notification of network congestion between sending and receiving endpoints of a packet flow in the TCP/IP based network. In particular, ECN provides a means to signal network congestion by "marking" packets in the packet flow to signal network congestion. For ECN to function, the endpoints for the packet flow and all network elements in the path between the endpoints must be ECN enabled.

If a network element in the path between the sending and receiving endpoints encounters congestion in respect of the packet flow (e.g. based on a queue congestion state) the network element may "mark" packets in the packet flow to indicate that the packets have experienced congestion. To facilitate this "marking", ECN utilises the two least significant bits in the differentiated services (DiffServ) field in the IPv4 or IPv6 header of the packets to indicate whether or not the associated packet has encountered congestion. In particular, the two "ECN bits" in the DiffServ field may be used to encode the following states for the associated packet:

| | | |
|---|---|---|
| 00 | Non-ECT: | endpoints are not ENC-capable; |
| 01 | ECT(1): | endpoints are ECN-capable; |
| 10 | ECT(0): | endpoints are ECN-capable; and |
| 11 | CE: | package has experience congestion. |

In this respect, note that there is no difference between bit codes 01 and 10, both of which indicate that the endpoints associated with the packet are capable of implementing ECN.

When the receiving endpoint receives a packet that has been marked to indicate that it has experienced congestion, the receiving endpoint may "echo" a congestion indicator to the sending endpoint by sending a packet marked to indicate congestion to the sending endpoint. In response to receipt of the congestion indicator from the receiving endpoint, the sending endpoint may reduce its transmission rate to alleviate the congestion. In this manner, ECN may be used to signal congestion within the network and thus avoid the inefficiencies associated with packet dropping and packet retransmission.

SUMMARY

In a first exemplary embodiment of the present invention, there is provided an apparatus for a base station in a radio access network, the apparatus configured to: detect a change in a radio network congestion status associated with a cell or cell sector of the base station that is being used to serve a mobile device, the change being a change to a given one of a plurality of possible radio congestion levels; start a packet modification process to modify one or more packets in each of one or more uplink data flows from the mobile device in a core network of the radio access network, the one or more packets in each of the one or more uplink data flows being modified by the packet modification process to signal, to a server in the core network, the change in congestion status to the given one of the plurality of possible radio congestion levels.

In this way, the base station can efficiently signal a server in the core network that is processing one or more dataflows that are being delivered to and/or sent from the mobile device in an ongoing data session to changes in the radio network congestion status of the cell or cell sector that is serving the mobile device.

As the signalling is achieved using one or more packets of the one or more uplink data flows, there is no requirement to use additional control plane signalling which would result in an additional overhead.

In a second exemplary embodiment of the present invention, there is provided an apparatus for a server in a core network of a radio access network, the apparatus configured to: detect one or more modified packets in each of one or more uplink data flows from a mobile device to the core network, the one or more uplink data flows being associated with a data session of the mobile device, the one or more modified packets being modified by a base station of a cell or cell sector serving the mobile device to indicate a current radio congestion level associated with the cell or cell sector, as determined by the base station, wherein a plurality of different radio congestion levels are possible; count, in at least a first time period, for each of the plurality of possible radio congestion levels, the number of the one or more uplink data flows that indicate that radio congestion level; and declare, in response to one or more predetermined criteria associated with the count being met, that a congestion level of the data session is at a given one of the possible radio congestion levels.

In this way, the server is kept informed of current radio congestion levels associated with the cell or cell sector serving the mobile device and can declare, in response to the one or more predetermined criteria associated with the count being met, that a congestion level of the data session of the mobile device is at a given one of the possible radio congestion levels. Thus the monitoring of radio congestion status at the cell or cell sector level is used by the server as an input for monitoring of the congestion status of an individual mobile device at that device's data session level.

In a third exemplary embodiment of the present invention, there is provided a method of operating a base station in a radio access network, the method comprising: detecting a change in a radio network congestion status associated with a cell or cell sector of the base station that is being used to serve a mobile device, the change being a change to a given one of a plurality of possible radio congestion levels; starting a packet modification process to modify one or more packets in each of one or more uplink data flows from the mobile device to a core network of the radio access network, the one or more packets in each of the one or more uplink data flows being modified by the packet modification process to signal, to a server in the core network, the change in congestion status to the given one of the plurality of possible radio congestion levels.

In a fourth exemplary embodiment of the present invention there is provided, a method of operating a server in a core network of a radio access network, the method comprising: detecting one or more modified packets in each of one or more uplink data flows from a mobile device to the core network, the one or more uplink data flows being associated with a data session of the mobile device, the one or more modified packets being modified by a base station of a cell or cell sector serving the mobile device to indicate a current radio congestion level associated with the cell or cell sector, as determined by the base station, wherein a plurality of different radio congestion levels are possible; counting, in at least a first time period, for each of the plurality of possible radio congestion levels, the number of the one or more uplink data flows that indicate that radio congestion level; and declaring, in response to one or more predetermined criteria associated with the count being met, that a congestion level of the data session is at a given one of the possible radio congestion levels.

In a fifth exemplary embodiment of the present invention there is provided a non-transitory computer readable storage medium comprising a set of computable readable instructions stored thereon, which, when executed by a processing system at a base station in a radio access network causes the system to: detect a change in a radio network congestion status associated with a cell or cell sector of the base station that is being used to serve a mobile device, the change being a change to a given one of a plurality of possible radio congestion levels; start a packet modification process to modify one or more packets in each of one or more uplink data flows from the mobile device to a core network of the radio access network, the one or more packets in each of the one or more uplink data flows being modified by the packet modification process to signal, to a server in the core network, the change in congestion status to the given one of the plurality of possible radio congestion levels.

In a sixth exemplary embodiment of the present invention there is provided a non-transitory computer readable storage medium comprising a set of computable readable instructions stored thereon, which, when executed by a processing system of a server in a core network of a radio access network causes the system to: detect one or more modified packets in each of one or more uplink data flows from a mobile device to the core network, the one or more uplink data flows being associated with a data session of the mobile device, the one or more modified packets being modified by a base station of a cell or cell sector serving the mobile device to indicate a current radio congestion level associated with the cell or cell sector, as determined by the base station, wherein a plurality of different radio congestion levels are possible; count, in at least a first time period, for each of the plurality of possible radio congestion levels, the number of the one or more uplink data flows that indicate that radio congestion level; and declare, in response to one or more predetermined criteria associated with the count being met, that a congestion level of the data session is at a given one of the possible radio congestion levels.

BRIEF DESCRIPTION OF THE DRAWINGS

Further features and advantages of the invention will become apparent from the following description of preferred embodiments of the invention, given by way of example only, which is made with reference to the accompanying drawings, of which.

Several parts and components appear in more than one of the accompanying drawings; for the sake of clarity the same reference numeral will be used to refer to the same part and component in all of the drawings.

DETAILED DESCRIPTION OF CERTAIN INVENTIVE EMBODIMENTS

It will be readily understood that the components of the embodiments as generally described herein and illustrated in the appended drawings could be arranged and designed in a wide variety of different configurations. Thus, the following description of various embodiments, as represented in the drawings, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this description to features, advantages, or similar language does not imply that all of the features and advantages that may be realized in any single embodiment. Rather, language referring to the features and advantages is understood to mean that a specific feature, advantage, or characteristic described in connection with an embodiment is included in at least one embodiment. Thus, discussions of the features and advantages, and similar language, throughout this description may, but do not necessarily, refer to the same embodiment.

Furthermore, the described features, advantages, and characteristics may be combined in any suitable manner in one or more embodiments. One skilled in the relevant art will recognize, in light of the description herein, that embodiments can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

Figure 1:
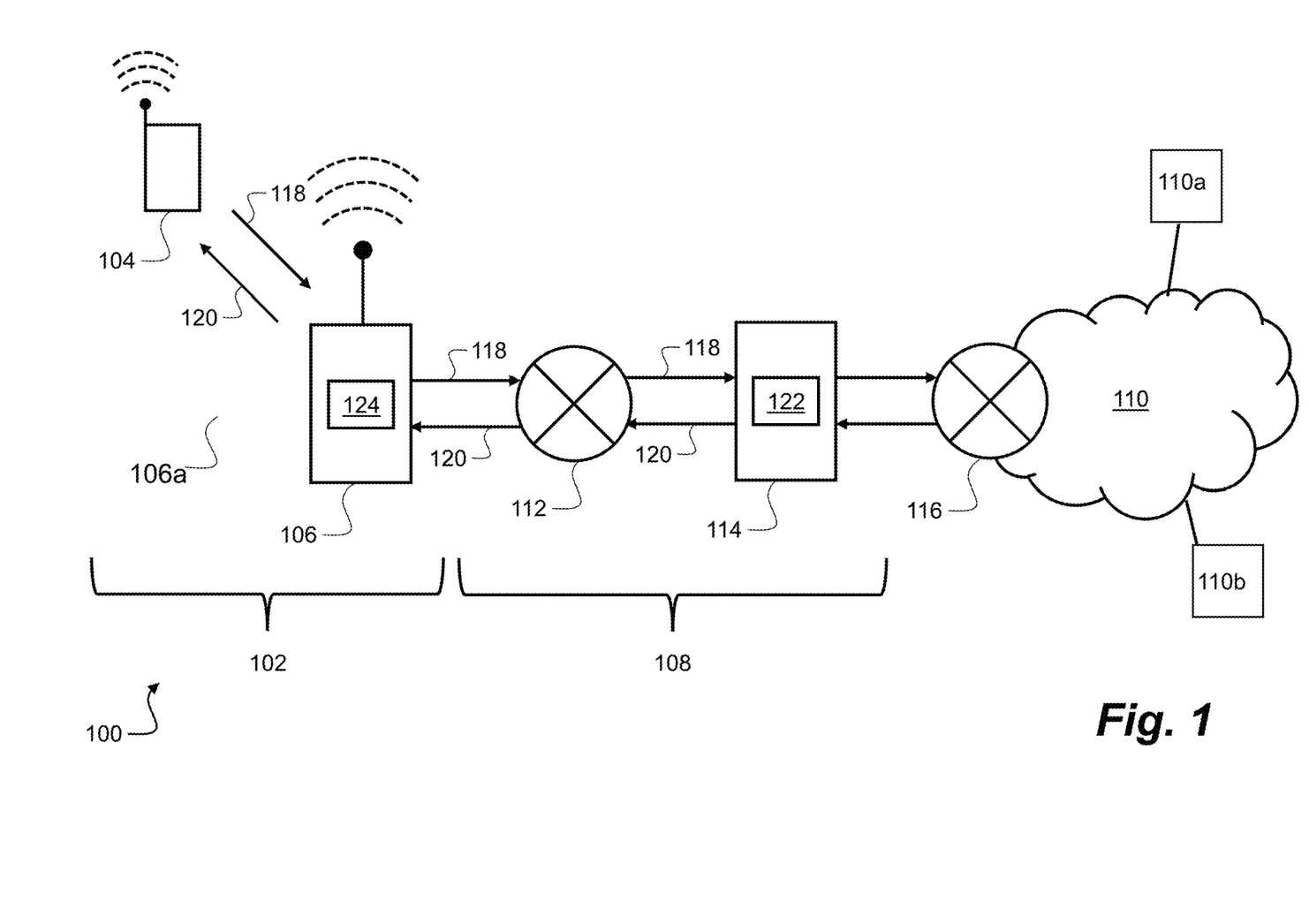
FIG. 1 is a schematic diagram showing congestion signalling in a network in accordance with an embodiment.

FIG. 1 depicts a network 100 in accordance with an embodiment. The network 100 comprises a radio access network 102 which provides wireless data access to a plurality of user devices or user equipment, such as user device 104. The radio access network 102 typically comprises a plurality of base stations such as the base station 106 that facilitates a wireless link between the user device 104 and a core network 108 within a geographical area 106a often referred to as a cell. The core network 108 provides connectivity between the radio access network 102 and a wide area network 110, such as the Internet. The core network 108 comprises one of more network elements, such as one or more router elements 112, and a gateway element 114 which provides the user device 104 with data access to the wide area network 110. In particular, the gateway element 114 includes functionality for IP address allocation, account billing, packet filtering and policy based management of packet flows associated with the user device 104. In some examples, the gateway element 114 may be connected to the wide area network by a router 116.

In some embodiments, the network 100 may be a cellular network in accordance with the 3rd Generation Partnership Project (3GPP) Long Term Evolution (LTE) standards. In such embodiments, the base station 106 may be an eNodeB in an LTE radio access network. Similarly, the gateway element 114 may take the form of is a Packet Data Network Gateway (PDN-GW) and the user device 104 may be a cellular telephone which is compliant with the LTE standards. In this respect, the PDN-GW is located in the IP user-plane between the eNodeB and the wide area network 110 and has access to the IP headers for packet flows associated with the user device 104.

The user device 104 may request content from one or more sources located in the wide area network 110, such as one or more origin servers 110a, 110b. In order to request and receive this content, the user device 104 will send and send and receive packet data over the radio access network 102 and the core network 108 via the base station 106 and the gateway element 114.

In this context, a data flow is associated with an 'end-to-end' exchange of data between the user device 104 and a given origin server 110a, 110b. This exchange of data is typically performed using an Application Layer (Layer 7) protocol, for example the Hypertext Transfer Protocol (HTTP) or HTTP secure (HTTPs) and a Transport Layer Protocol (Layer 4), for example, the Transmission Control Protocol (TCP) or the User Datagram Protocol (UDP).

Accordingly, a data flow may be defined as the flow of data between a client side endpoint (not shown) at the user device 104 and a server side end-point (not shown) at a given origin server 101a, 101b over a Transport Layer connection, typically, a TCP connection. As is common place in the art, the TCP Connection may be so called 'split' TCP connection comprising a first TCP connection between the user device 104 and the gateway element 114 and a second TCP connection between the gateway element 114 and the given origin server 101a, 101b.

The client side end point in this connection is a client socket, typically, a TCP socket defined by a client IP address and client port number and likewise the server side end point in the connection is TCP socket defined by a server IP address and server port number.

A given data flow is thus identifiable by virtue of a 4-tuple comprising: client IP address, client port number, origin server IP address, origin server port number contained in the headers of packets of the data flow. Accordingly, the base station 104 and the gateway element 114 can use such 4-tuples (or one or more of their elements) to identify and monitor the individual data flows.

As is standard in networks that use a TCP/IP protocol suite, each Layer 7 request, for example, a HTTP request, and each corresponding Layer 7 response HTTP response is transported over a Transport Layer connection such as a TCP connection in one or more TCP segments with each TCP segment itself being transported in one or more IP packets.

Accordingly, in this respect, in a given data flow, the flow of packets in the direction from the user device 104 to a given origin server 110a, 110b is termed an "uplink data flow" and the flow of packets in the opposite direction from the origin server 110a, 110b to the user device 104 is termed a "downlink data flow".

It will be appreciated by those skilled in the art that at any given time during a data session of the user device 104, there may be a plurality of 'distinct' such data flows between the user device 104 and one or more of the origin servers 101a, 101b in existence at the same time. For example, a first group of one or more data flows may exist between a first application (not shown) running on the user device 104, for example, a Web Browser app and one or more of the origin servers 110a, 110b in order to download a Web Page to the user device 104. At the same time, a second group of one or more data flows may exist between a second application running on the user device 104, for example a video playing app and one or more of the origin servers 110a, 110b in order to download video content to the user device 104. It will be appreciated that throughout a data session, new data flows may be set up and existing data flows closed down in consequence of delivering to the user device 104 content requested by a user of the user device 104 using the various apps running on the user device 104.

In FIG. 1, one or more uplink data flows from the user device 104 are represented as 118 and one or more downlink data flows to the user device 104 are represented as 120. The one or more downlink data flows 120 and the one or more uplink data flows 118 transfer data of an ongoing data session of the user device 104.

The base station 106 comprises a congestion monitoring component 124 which is configured to monitor a radio connection congestion status of the cell 106a or a sector of the cell 106a of the base station 106 that is serving the user device 104 in order to detect a change in the radio network congestion status. As will be explained in more detail below, a plurality of different possible radio congestion levels are pre-defined in the radio access network 102 and the change is a change to a given one of those radio congestion levels. In principle, any number of different possible radio congestion levels are definable in the radio access network 10 and in an example described herein there are four levels, namely, 'No Congestion', 'Low Congestion', 'Medium Congestion' and 'High Congestion'.

In one example, the radio connection congestion status is a congestion status of the cell 106a (or cell sector) downlink traffic, that is to say, the congestion status of the current total downlink traffic being provided by the base station 106 to user devices such as the user device 104 in the cell 106a (or cell sector) of the base station 106. In another example, the radio connection congestion status is a congestion status of the cell 106a (or cell sector) uplink traffic, that is to say, the congestion status of the current total uplink traffic being provided by user devices such as the user device 104 in the cell 106a (or cell sector) to the base station 106. In a yet further example, the radio connection congestion status is a congestion status of the cell 106a (or cell sector) total traffic, that is to say, the congestion status of the combined total uplink traffic and total downlink traffic in the cell 106a (or cell sector).

The congestion monitoring component 124 may be configured to monitor the congestion status of the cell, or cell sector, downlink traffic, uplink traffic or combination thereof using any suitable technique. For example, known suitable techniques include monitoring the total throughput of downlink traffic and/or uplink traffic being transmitted by and/or received by the base station 106 in that cell 106a (or cell sector); monitoring the average delay at the base station 106 of packets in the downlink direction prior to be being transmitted to the user devices in the cell 106a (or cell sector) and/or the average delay at the base station 106 of packets received from the user devices in the cell 106a (or cell sector) in the uplink direction prior to being transmitted onwards into the core network; or monitoring downlink and/or uplink resource utilization, for example, Physical Resource Blocks (PRB) in the case of a LTE base station.

In response to detecting a change in the radio connection congestion status the congestion monitoring component 124 may start a packet modification process in respect of one or more packets in each of the one or more uplink data flows 118 from the user device 104 to signal the change in congestion status to a given one of a plurality of possible radio congestion levels. In this manner, one or more network elements upstream of the base station 106 may be informed of the change of congestion status detected by the congestion monitoring component 124 and, as will be explained in more detail below, take appropriate action in respect of one or more of the downlink data flows 120 to the user device 104 and/or one or more of the uplink data flows 120 from the user device 104 in a current data session.

It will be appreciated by those skilled in the art that the IP data packets of the one or more uplink flows 118 and the data packets of the one or more downlink flows 120 may be tunnelled between the base station 106 and the gateway element 114 in accordance with a General Packet Radio Service (GPRS) tunnelling protocol.

In the present embodiment, the gateway element 114 comprises a traffic management component 122 which is configured to inspect packets in the one or more uplink data flows 118 and detect packets which have been modified by the congestion monitoring component 124 of the base station 106 to indicate the change of congestion status.

The traffic management component 122 is arranged to count, in at least a first time period, for each of the plurality of possible radio congestion levels, the number of the one or more uplink data flows 118 from the user device 104 that indicate that radio congestion level.

Based at least in part on that count, if one or more predetermined criteria are met, the traffic management component 122 is arranged to declare that a data session congestion level that is specific to the user device 104 is at a given one of the possible radio congestion levels.

Upon declaring that a data session congestion level of the user device 104 is at a given one of the possible radio congestion levels, traffic management component122 may implement one or more countermeasures to alleviate or relieve congestion in the one or more downlink data flows 120 to the user device 104 and/or the one or more uplink data flows 118 from the user device 104.

For example, the traffic management component 122 may implement one or more of an optimisation process, a compression processes, and/or a traffic shaping process in respect of the one or more downlink data flows 120 and/or the one or more uplink data flows 118 in an effort to alleviate or reduce congestion.

In some embodiments, upon declaring that a data session congestion level of the user device 104 is at a given one of the possible radio congestion levels, the traffic management component 122 may modify one or more packets in one or more of the downlink data flows 120 to the user device 104 to signal an acknowledgement of the change of congestion status signalled by modified packets in the one or more uplink data flows 118.

In these embodiments, the congestion monitoring component 124 is configured to monitor or inspect packets in the one or more downlink data flows 120 to detect the packets which have been modified by the traffic management component 122 to indicate the acknowledgement of the change of congestion status. Upon detecting one or more such packets signalling the acknowledgement of the change of congestion status, the congestion monitoring component 124 may stop the packet modification process of the one or more uplink data flows 118. In this manner, the congestion monitoring component 124 need only implement the package modification process until acknowledgement of the change of congestion status has been acknowledged by the traffic management component 122, thereby reducing computational overhead.

After detecting the acknowledgement of the change of congestion status from the traffic management component 122, the congestion monitoring component 124 may continue to monitor the radio connection congestion status of the cell 106a (or cell sector) of the base station 106 to detect a subsequent change of congestion status i.e. either to a lower level of congestion or a higher level of congestion than the current level of congestion. In response to detecting a subsequent change of congestion status, the congestion monitoring component 124 may restart the packet modification process to signal the subsequent change of congestion status to the traffic management component 122. Upon declaring that the data session congestion level for the user device 104 has changed to the new congestion level, the traffic management component 122 may stop or reduce the one or more countermeasures (e.g. in the case where the subsequent change of congestion status indicates that the congestion has been cleared or is lower) or implement further or increased countermeasures (e.g. in the case where the congestion status has increased) as required.

The signalling of changes of congestion status from the congestion monitoring component 124 to the traffic management component 122 and the reciprocal acknowledgement from the traffic management component 122 to the congestion monitoring component 124 acts as a "two-way handshake" in respect of changes of the congestion status. This two-way handshake enables changes of congestion status to be notified with reduced overhead (i.e. continuous signalling of congestion status is not required) whilst ensuring that the traffic management component 122 is notified of changes of congestion status in real-time. In turn, this ensures that the traffic management component 122 only employs countermeasures in respect of the data session when congestion is detected by the congestion monitoring component 124. In this manner, the volume of data carried over the network 100 as a whole may be maximised, which may be advantageous in scenarios where the revenue received by an operator is at least in part dependent on the volume of data carried over the network 100.

In some embodiments, signalling between the congestion monitoring component 124 and the traffic management component 122 may utilise one or more bits in the headers of packets in the one or more uplink data flows 118 and the one or more downlink data flow 120. In one example, the congestion monitoring component 124 and the traffic management component 122 may utilise the two least significant bits in the differentiated services (DiffServ) field of the IPv4 or IPv6 header of the packets.

In one example, the congestion monitoring component 124 utilises the two bits in the DiffServ field of packets in the one more uplink data flows 118 to signal changes in absolute congestion states as detected by the congestion monitoring component 124, as follows:

| | |
|---|---|
| 00 | No Congestion; |
| 01 | Low Congestion; |
| 10 | Medium Congestion; and |
| 11 | High Congestion. |

Likewise, in the same way, the traffic management component 122 may utilise these two bits in the DiffServ field of packets in the one more downlink data flows 120 to signal the acknowledgment of the change in congestion state.

It will be appreciated that the number of congestion states which can be signalled between the congestion monitoring component 124 and the traffic management component 122 is dependent on the number of bits in the header available for encoding of the congestion states. In this respect, some embodiments may utilise additional bits in the IPv4 or IPv6 header to increase the number of congestion states that can be signalled by the congestion monitoring component 124 to the traffic management component 122. In other words, increasing the number of bits in the header used to encode the congestion status enables the congestion monitoring component 124 to report the congestion status of the downlink data flow 120 to the traffic management component 122 with increased granularity.

In some examples, congestion monitoring component 124 may further utilise bits in the header to encode whether the congestion status relates to congestion in the downlink direction or congestion in the uplink direction.

Figure 2:
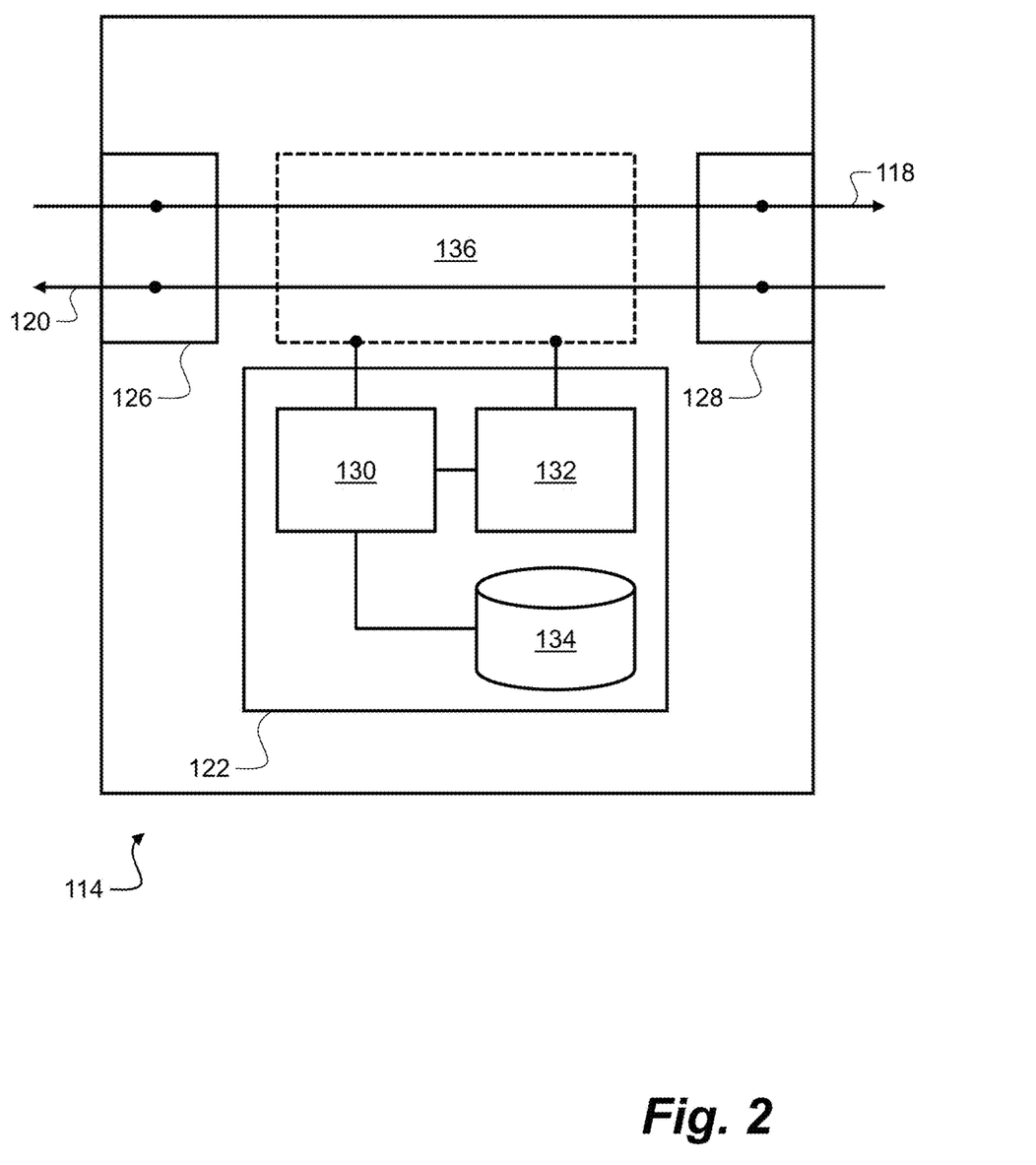
FIG. 2 is a schematic diagram showing a traffic management component in accordance with an embodiment.

FIG. 2 is a schematic diagram showing the gateway element 114 comprising the traffic management component 122 of FIG. 1 in further detail. The gateway element 114 comprises a first network interface 126 which is configured to send and receive packet data to and from the user device 104 via the base station 106, and a second network interface 128 which is configured to send and receive packet data to and from the wide area network 110 via the router 116. In other words, the first network interface 126 and the second network interface 128 act to proxy packets in the one or more uplink data flows 118 and the one or more downlink data flows 120. This enables the gateway element 114 to inspect and modify packets in the one or more uplink data flows 118 and the one or more downlink data flows 120, as discussed below in further detail.

The traffic management component 122 comprises a congestion control function 130, a congestion avoidance function 132 and a policy management function 134. The congestion control function 130 is configured to inspect data packets in the one or more uplink data flows 118 to detect one or more packets modified by the congestion monitoring component 124 of the base station 106 to signal a change of congestion status. To facilitate this inspection, the congestion control function 130 may be provided with access to one or more buffers 136 which temporarily store or hold packet data associated with the one or more uplink data flows 118 and the one or more downlink data flows 120.

As discussed above, the congestion control function 130 is arranged to count, in at least a first time period, for each of the plurality of possible radio congestion levels, the number of the one or more uplink data flows 118 from the user device 104 that indicate that particular radio congestion level.

Based at least in part on that count, if one or more predetermined criteria are met, the traffic management component 122 is arranged to declare that a data session congestion level of the user device 104 is at a given one of the possible radio congestion levels.

Figure 3:
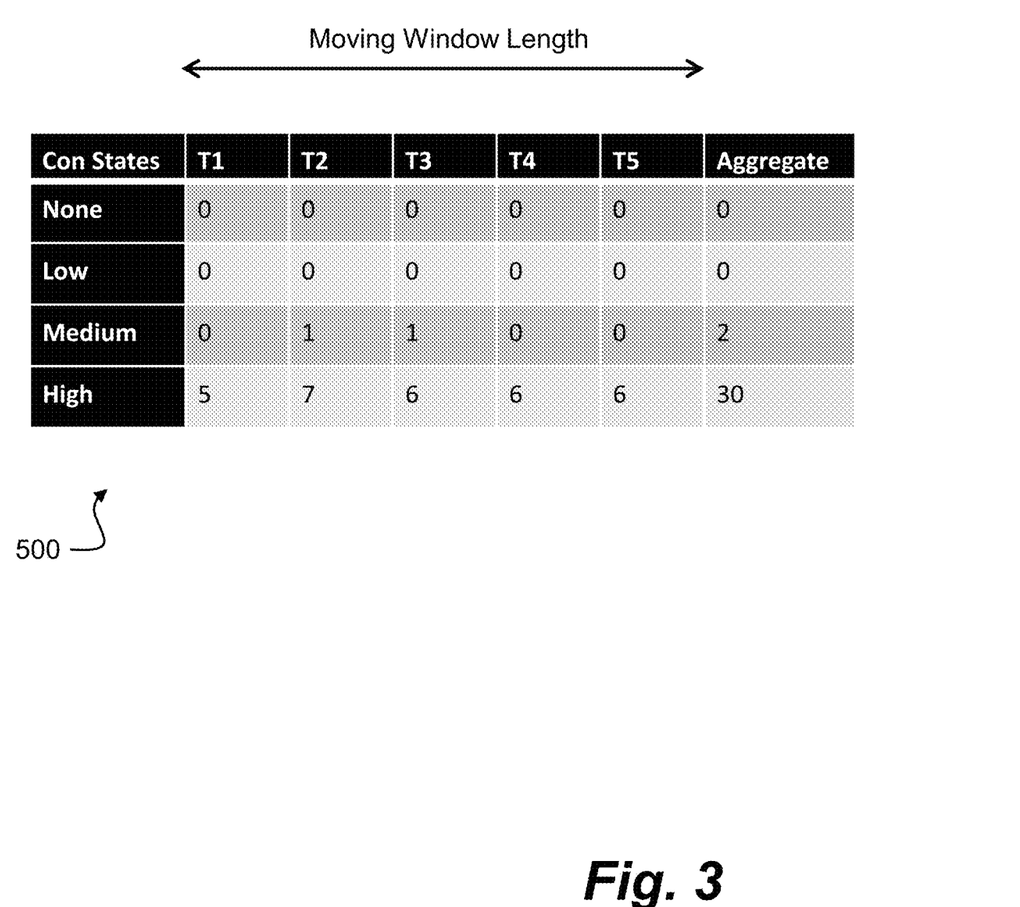
FIG. 3 is a schematic diagram showing a sliding window function.

In one particular example, illustrated in FIG. 3, the congestion control function 130 runs an aggregated moving window operation 500, in which, for each of the, possible congestion states (Con States), the congestion control function 130 counts in each of the time intervals (T1 to T5) that together define the length of the moving window operation 500, the number of the one or more uplink data flows 118 that are indicated as having that radio congestion level in that time period. The congestion control function 130 aggregates, for each of the possible congestion states, the counts of the time intervals (T1 to T5) that together define the length of the moving window operation 500 to generate an aggregated count for each possible congestion states C.

The congestion control function 130 may then, for example, select the radio congestion state having the highest aggregated count (which is Con State High in the example of FIG. 3) and if one or more predetermined criteria are met, for example, if the selected highest aggregated count (which is 30 in the example of FIG. 3) is greater than a predetermined threshold value, declare that the data session congestion level is at this radio congestion level.

Upon declaring that a data session congestion level is at a given one of the possible radio congestion levels, the congestion control function 130 may modify one or more packets in one or more of the downlink data flow 120 to signal an acknowledgement of the change of congestion status to the congestion monitoring component 124 of the base station 106, as discussed above.

In addition to signalling acknowledgement of the change of congestion status, the congestion control function 130 may instruct the congestion avoidance function 132 to initiate, modify or stop an appropriate congestion avoidance process to reduce congestion in one or more of downlink data flows 120 to the user device 104 and/or one or more of the uplink data flows 118 from the user device 104. The congestion avoidance process may comprise modifying one or more characteristics of the one or more downlink data flows 120 and/or modifying one or more characteristics of the one or more uplink data flows 118 to alleviate the congestion detected by the congestion monitoring component 124 of the base station 106.

In some examples, the congestion avoidance process may comprise one or more of an optimisation process, a compression processes, and/or a traffic shaping process in respect of packets of the one or more downlink data flows 120 and/or the one or more uplink data flows 118. To enable modification of the one of more characteristics, the congestion avoidance function 132 may be provided with access to the one or more buffers 136 which temporarily store the packet data associated with the one or more uplink data flows 118 and the one or more downlink data flows 120.

In some examples, the congestion control function 130 may instruct the congestion avoidance function 132 to initiate the congestion avoidance process in accordance with one or more policies managed by the policy management function 134. For example, the congestion control function 130 may retrieve one or more policies specific and applicable to the user device 104 in response to a change in congestion status signalled by the congestion monitoring component 124 of the base station 106. In other examples, the congestion control function 130 may retrieve the one or more policies applicable to the user device 104 during an initial negotiation process between the congestion monitoring component 124 and the traffic management component 122 in respect of the user device 104. In some examples, the policy management function 134 may be provided by an element which is remote from the gateway element 114, such as a remote server.

Accordingly, it will be appreciated that in any given set of circumstances, a different congestion avoidance process may be used in respect of different ones of the user devices even if those devices are in the same cell or sell sector dependent upon the one or more policies specific to those devices. For example, a policy specific to one user device may specify that video data to that device in a data session that has been declared to be of High Congestion should be compressed relatively heavily whereas a policy specific to a different user device may specify that video data to that device in a data session that has been declared to be of High Congestion should be compressed but relatively lightly. Typically, policies will be set according to the level of service that the network subscribers of the user devices subscribe to.

Figure 4:
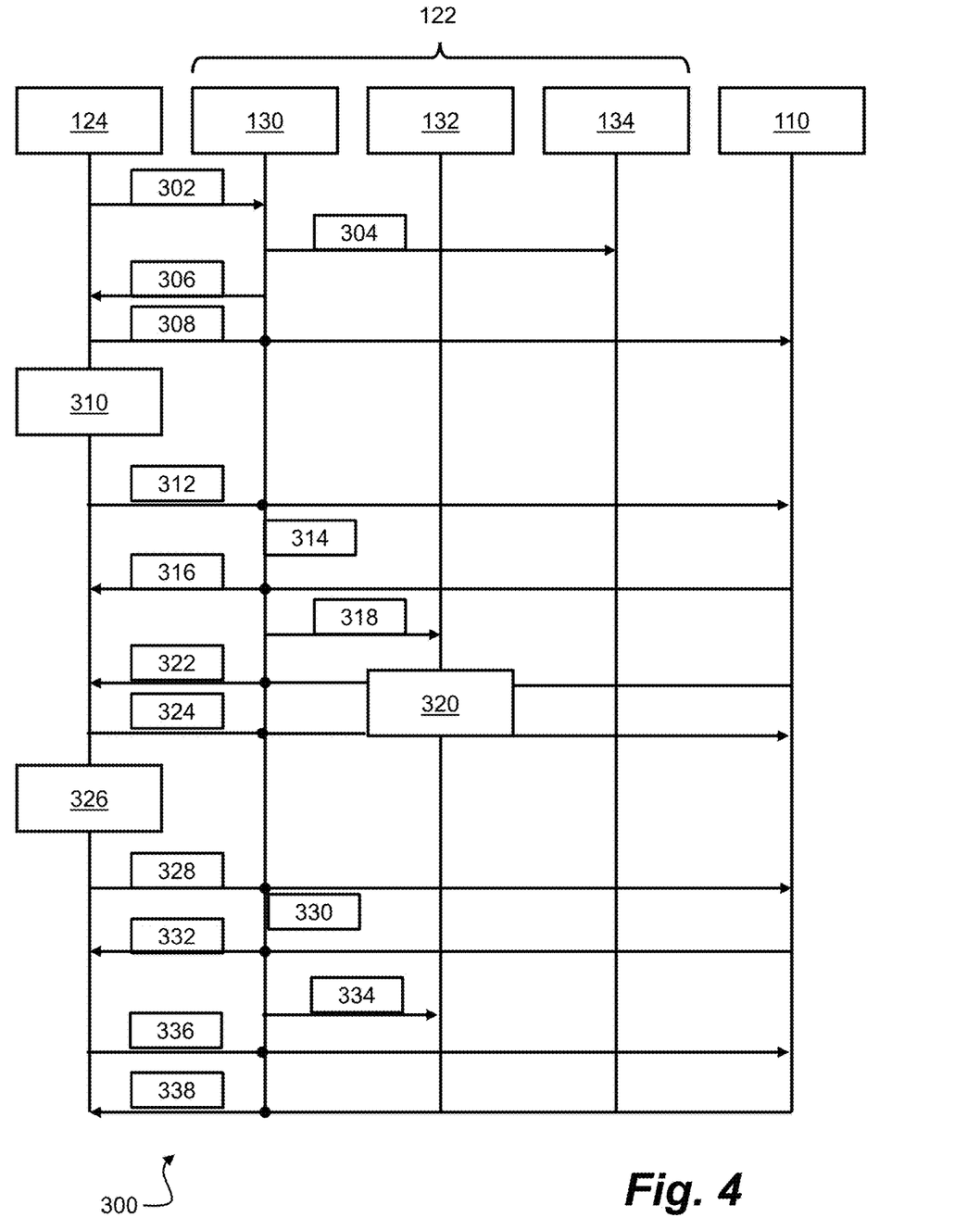
FIG. 4 is a signalling diagram showing a method of signalling congestion in a network in accordance with an embodiment.

FIG. 4 is a signalling diagram showing a method 300 for monitoring congestion in accordance with an embodiment with reference to the gateway element shown in FIG. 2. In particular, the signalling diagram of FIG. 4 shows data flow between the congestion control component 130, the congestion avoidance function 132 and the policy management function 134 of the traffic management component 122, and the congestion monitoring component 124 of the base station 106.

In a first step, the congestion monitoring component 124 signals an initial radio congestion status for the user device 104 to the congestion control function 130 of the traffic management component 122 (step 302). This may be performed in response to a particular event, such as the user device 104 successfully attaching to the base station 106 or the user device 104 initiating a data session with an origin server 110a, 110b located in the wide area network 110 or detecting a first packet from the user device 104. In response to signalling of the initial congestion state, the congestion control function 130 communicates with the policy management function 134 to retrieve one of more policies applicable to the user device 104 (step 304). The congestion control function 130 may subsequently store the one or more policies in memory for use in controlling the congestion avoidance function 132 based on changes to congestion status as signalled by the congestion monitoring component 124 of the base station 106. In some examples, the congestion control function 130 may signal acknowledgement of the initial congestion status to the congestion monitoring component 124 of the base station 106 by modifying one or more packets in the one or more downlink data flows 118 to the user device 104, as discussed above in relation to FIG. 1 (step 306).

Following the initial negotiation process between the congestion monitoring component 124 and the congestion control function 130 (i.e. steps 302, 304 & 306), the congestion control function 130 proceeds to monitor packets in the one or more uplink data flows 118 to identify any packets which have been modified by the congestion monitoring component 124 to signal a change in the radio congestion status (step 308). Upon detection of a change of congestion status, (step 310), the congestion monitoring component 124 initiates the packet modification process to modify one or more packets in the one or more uplink data flows 118 (step 312). The congestion control function 130 detects (step 312), the one or more modified packets in the one or more uplink data flows 118. Next, in accordance with the procedure described above, the congestion control function 130 declares that a data session congestion level of the user device 104 is at a given one of the possible radio congestion levels (step 314). The congestion control function 130 then modifies one or more packets in the one or more downlink data flows 120 to the user device 104 to signal an acknowledgement of the change in congestion status signalled by the congestion monitoring component 124 (step 316). Upon receipt of the acknowledgement from the congestion control function 130, the congestion monitoring component 124 may stop the packet modification process to avoid unnecessary overhead (not shown).

The congestion control function 130 then instructs the congestion avoidance function 132 to initiate a congestion avoidance process (step 318). In this manner, the congestion avoidance process acts (step 320) to modify one or more characteristics of one or more of the downlink data flows 120 (step 322) and/or of the one or more uplink data flows 118 (step 324) to alleviate or reduce congestion as discussed above with reference to FIGS. 1 & 2.

At a later time, the congestion monitoring component 124 may detect a further change in the radio congestion status. For example, the congestion monitoring component 124 may detect that the radio congestion status has changed to a No Congestion or Low Congestion level (step 326). In response to this detection, the congestion monitoring component 124 initiates the packet modification process to modify one or more packets in the one or more uplink data flows 118 to signal the change in congestion status (step 328). The congestion control function 130 detects (step 328) the one or more modified packets in the one or more uplink data flows 118. Next, again in accordance with the procedure described above, the congestion control function 130 declares that a data session congestion level of the user device 104 is now at the No or Low Congestion level (step 330).

The congestion control function 130 modifies one or more packets in the one or more downlink data flows to signal an acknowledgement of the change in congestion status signalled by the congestion monitoring component 124 (step 332). Upon receipt of the acknowledgement from the congestion control function 130, the congestion monitoring component 124 may stop the packet modification process (not shown).

The congestion control function 130 instructs the congestion avoidance function 132 to stop the congestion avoidance process (step 334), following which the data packets in the one or more uplink data flows (step 336) and the one or more downlink data flows (step 338) traverse the traffic management component without modification by the congestion avoidance function 132.

Figure 5:
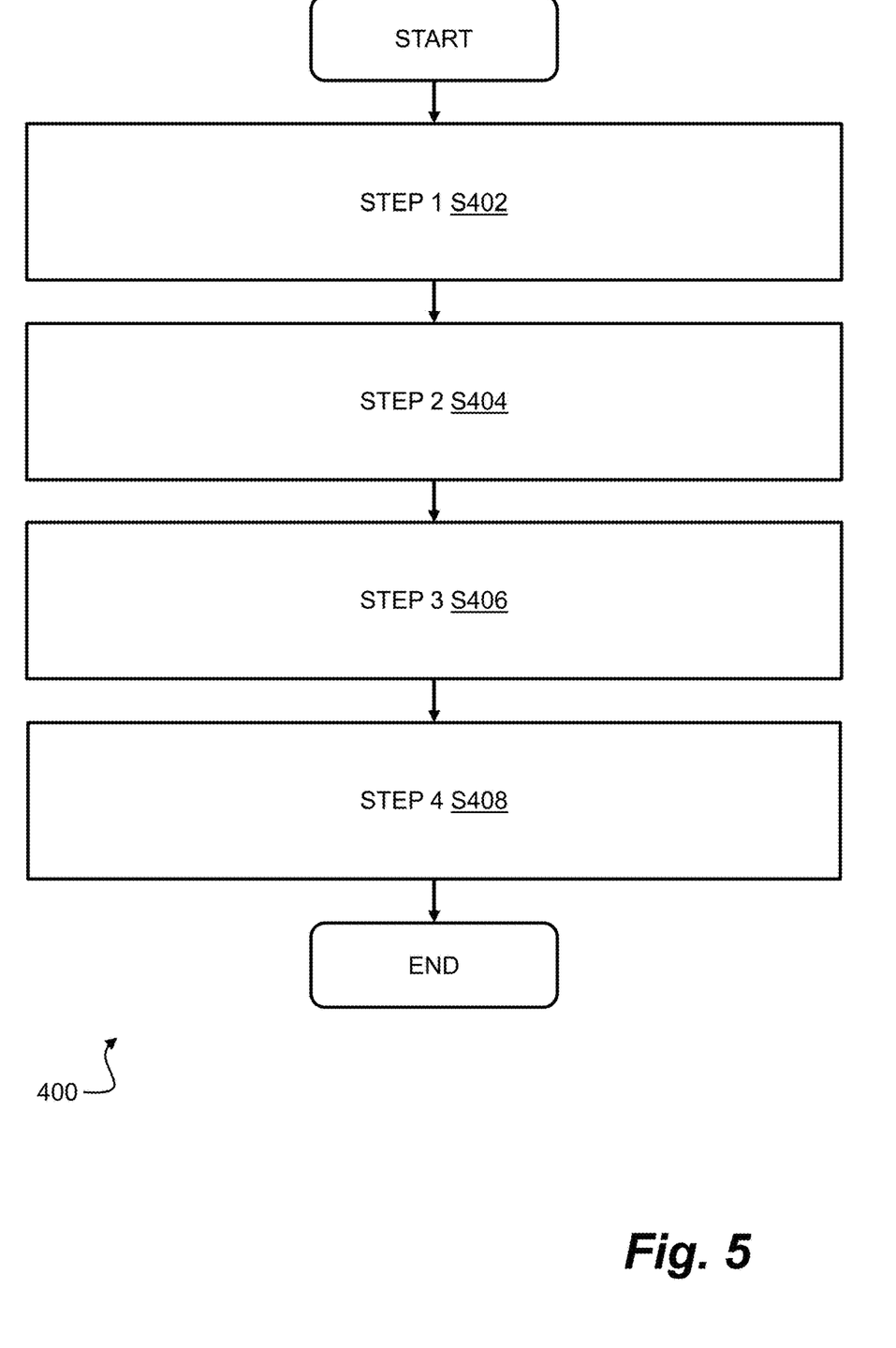
FIG. 5 is a flow chart showing a method of signalling congestion in a network in accordance with an embodiment.

FIG. 5 shows a method of signalling congestion status performed by a base station in a radio access network. At step S402, the base station detects a change in a radio network congestion status of a cell or cell sector of the base station that is being used to serve a mobile device, the change being a change to a given one of a plurality of possible radio congestion levels. At step S404, the base station starts a packet modification process to modify one or more packets in each of one or more uplink data flows from the mobile device to a core network of the radio access network, the one or more packets in each of the one or more uplink data flows being modified by the packet modification process to signal the change in congestion status to the given one of a plurality of possible radio congestion levels to a server in the core network. At step S406, the base station detects, in a downlink data flow from the core network to the mobile device, at least one packet which has been modified by the server to indicate an acknowledgement of the change in congestion status signalled by the one or more packets modified by the packet modification process. At step S408, the base station stops the packet modification process in response to detecting the packet which has been modified by the server to indicate acknowledgement of the change in congestion status.

Figure 6:
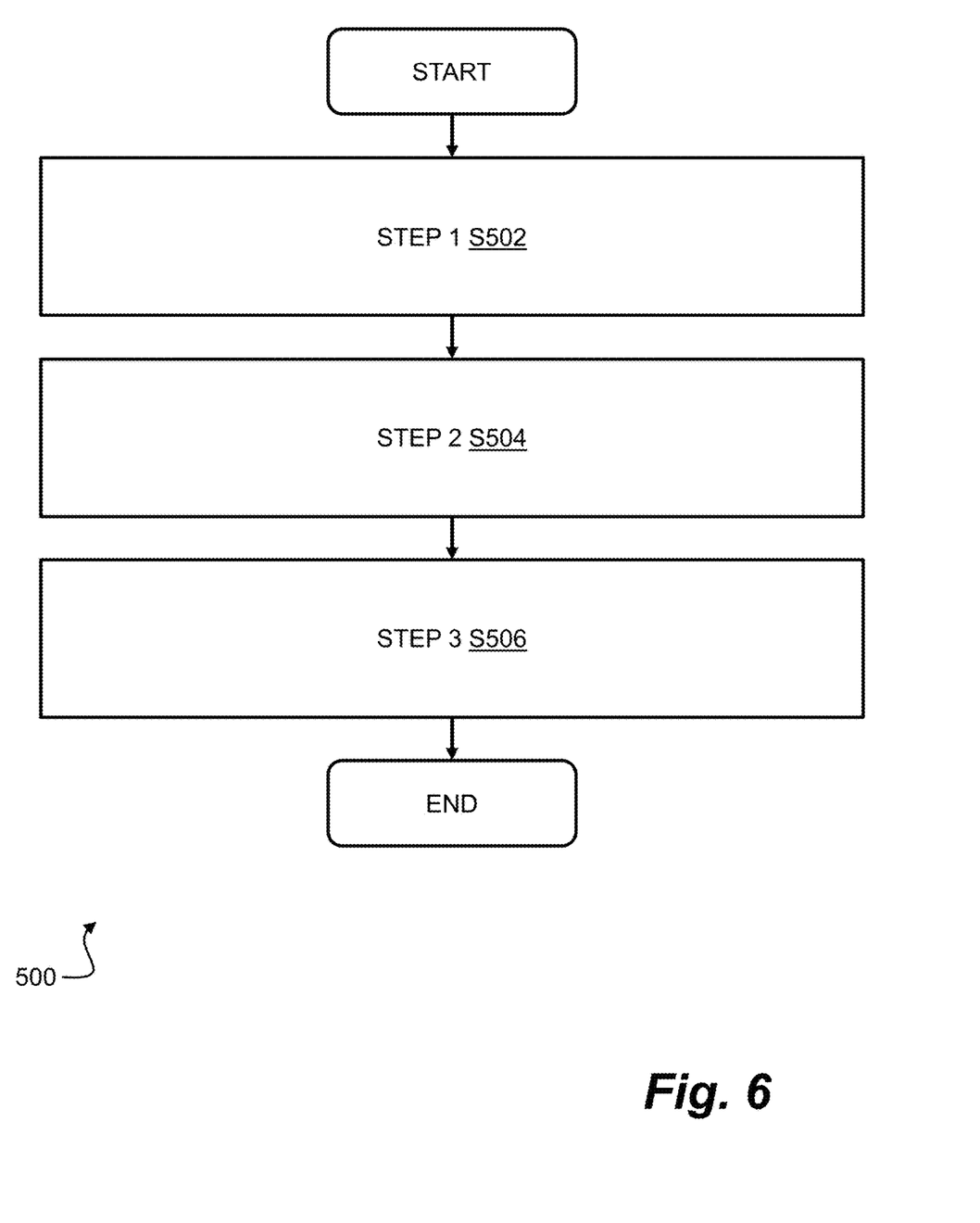
FIG. 6 is a flow chart showing a method of controlling congestion performed in accordance with an embodiment.

FIG. 6 shows a method of controlling congestion performed by a server in a core network. At step S502, the server detects one or more modified packets in each of one or more uplink data flows from a mobile device to the core network, the one or more uplink data flows being associated with a data session of the mobile device, the modified packets being modified by a base station of a cell or cell sector serving the mobile device to indicate a current radio congestion level, as determined by the base station, of the cell or cell sector, wherein a plurality of different radio congestion levels are possible. At step S504, the server counts, in at least a first time period, for each of the plurality of possible radio congestion levels, the number of the one or more uplink data flows that indicate that radio congestion level. At step S506, the server based at least in part on the count, declares that a data session congestion level is at a given one of the possible radio congestion levels if one or more predetermined criteria are met.

In the embodiments described above, the congestion monitoring component 124 monitors a single congestion status, for example, the congestion status of the downlink direction of the cell 106a (or cell sector) or the congestion status of the uplink direction of the cell 106a (or cell sector). In other embodiments, the congestion monitoring component 124 may independently monitor a plurality of different types of congestion statuses, for example, the congestion status of the downlink direction of the cell 106a (or cell sector) and the congestion status of the uplink direction of the cell 106a (or cell sector) and, in a similar manner as in the examples described above, independently signal changes in the congestion status of each to the traffic management component 122. Likewise, the traffic management component 122 may, in a similar manner as in the examples described above, independently monitor for, declare and acknowledge changes in the congestion status of the downlink direction and the uplink direction. In these examples, the traffic management component 122 may implement different countermeasures one or more downlink 120 dataflows as compared to those implemented on one or more uplink 118 dataflows dependent upon the respective indicated congestion statuses of the downlink direction and the uplink direction.

Figure 7:
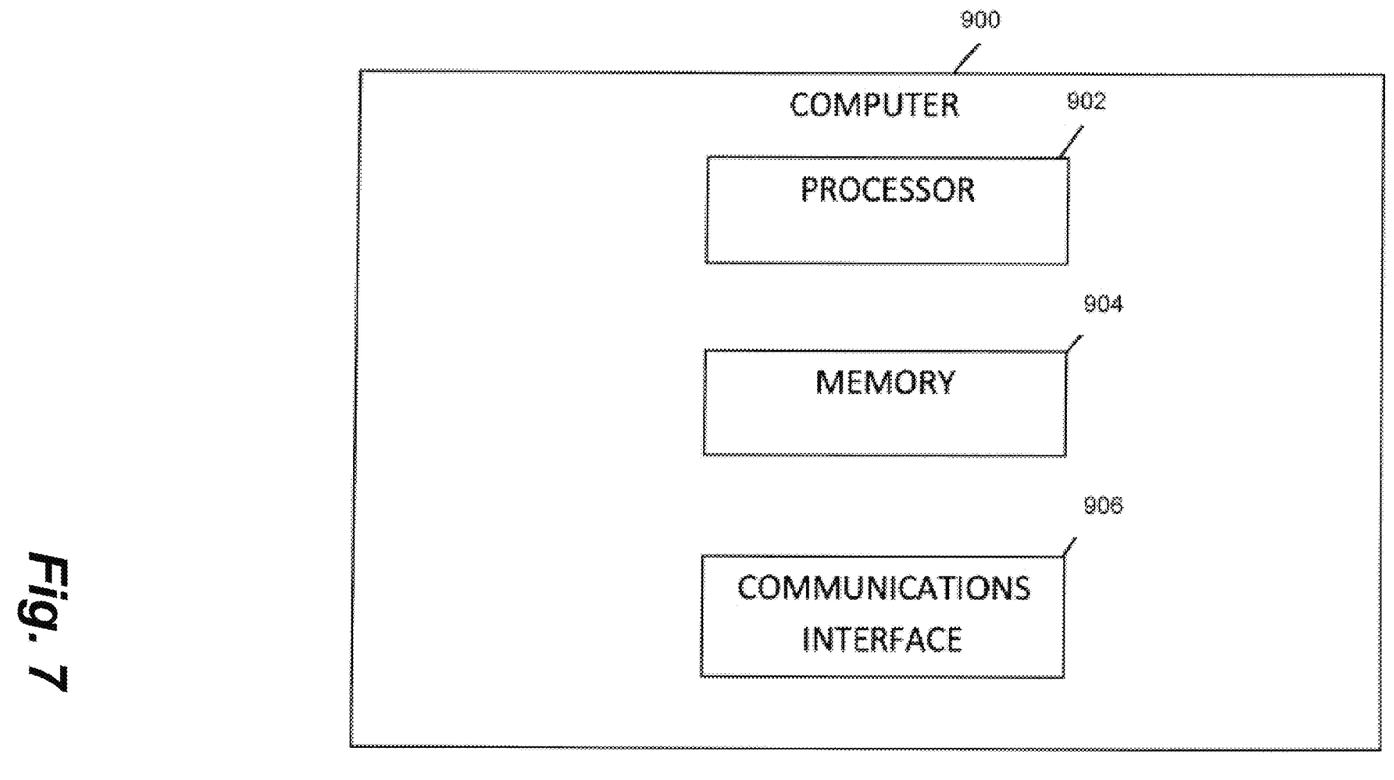
FIG. 7 is a schematic drawing of a computer system.

According to some embodiments, the congestion monitoring component 124 and the traffic management component 122 may be implemented by a computer system executing computer readable instructions. FIG. 7 shows an example of a suitable computer system 900. The computer system 900 includes a processor 902, memory 904, and a communications interface 906. The processor may include a multifunction processor and/or an application-specific processor. Examples of processors include, without limitation, the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An apparatus for a base station in a radio access network, the apparatus comprising a processor and a memory storing computer readable instructions, the memory and the computer readable instructions being configured to, with the processor, cause the apparatus to:
   detect a change in a radio network congestion status associated with downlink traffic of a cell or cell sector of the base station that is being used to serve a mobile device, the change being a change to a given one of a plurality of possible radio congestion levels;
   start a packet modification process to modify one or more packets in each of one or more uplink data flows from the mobile device to a core network of the radio access network, the one or more packets in each of the one or more uplink data flows being modified by the packet modification process to signal, to a server in the core network, the change in congestion status to the given one of the plurality of possible radio congestion levels, wherein the apparatus is configured to modify the one or more packets in each of the one or more uplink data flows by updating a field in an IP packet header of each of the one or more packets to signal in each packet the change in congestion status;
   detect, in each of one or more downlink data flows from the core network to the mobile device, at least one packet which has been modified by the server to indicate an acknowledgement of the signalled change in congestion status; and
   stop the packet modification process in response to detecting the acknowledgement of the change in congestion status.

2. The apparatus of claim 1, wherein the field is a differentiated services field in the packet header of each of the one or more packets in the one or more uplink data flows.

3. The apparatus of claim 2, wherein the memory and the computer readable instructions are configured to, with the processor, cause the apparatus to:
modify one or more bits in the differentiated services field in the packet header of each of the one or more packets in the one or more uplink data flows to encode the change in a congestion status.

4. The apparatus of claim 1, wherein the memory and the computer readable instructions are configured to, with the processor, cause the apparatus to:
inspect packet headers of packets in the one or more downlink dataflows to detect the one or more packets which have been modified by the server to indicate acknowledgement of the change in congestion status.

5. An apparatus for a server in a core network of a radio access network, the apparatus comprising a processor and a memory storing computer readable instructions, the memory and the computer readable instructions being configured to, with the processor, cause the apparatus to:
detect one or more modified packets in each of one or more uplink data flows from a mobile device to the core network, the one or more uplink data flows being associated with a data session of the mobile device, the one or more modified packets being modified by a base station of a cell or cell sector serving the mobile device by updating a field in an IP packet header of the one or more modified packets to indicate a current radio congestion level associated with the cell or cell sector, as determined by the base station, wherein a plurality of different radio congestion levels are possible;
count, in at least a first time period, for each of the plurality of possible radio congestion levels, the number of the one or more uplink data flows that indicate that radio congestion level; and
declare, in response to one or more predetermined criteria associated with the count being met, that a congestion level of the data session is at a given one of the possible radio congestion levels.

6. The apparatus of claim 5, wherein the memory and the computer readable instructions are configured to, with the processor, cause the apparatus to:
count, in each of a plurality of successive time periods, for each of the plurality of possible radio congestion levels, the number of the one or more uplink data flows that indicate that radio congestion level in that time period; and
declare, in response to one or more predetermined criteria associated with the count being met, that a data session congestion level is at a given one of the possible radio congestion levels.

7. The apparatus of claim 6 wherein the plurality of successive time periods together define a moving time window.

8. The apparatus of claim 5, wherein the memory and the computer readable instructions are configured to, with the processor, cause the apparatus to:
start a congestion avoidance process to modify at least one characteristic of one or more downlink or one or more uplink data flows associated with the data session of the mobile device.

9. The apparatus of claim 8 wherein the memory and the computer readable instructions are configured to, with the processor, cause the apparatus to:
determine the congestion avoidance process based on a policy specific to the mobile device.

10. The apparatus of claim 5, wherein the memory and the computer readable instructions are configured to, with the processor, cause the apparatus to:
modify a packet in each of one or more downlink data flows from the core network to the mobile device and associated with the data session to signal to the base station an acknowledgement of a change in congestion status to the given one of the possible radio congestion levels.

11. The apparatus of claim 10, wherein the memory and the computer readable instructions are configured to, with the processor, cause the apparatus to:
modify the packet in each of one or more of the downlink data flows by updating a field in a packet header of the packet to signal the acknowledgement of the change in congestion status.

12. The apparatus of claim 11, wherein the field is a differentiated services field in the packet header of the packet.

13. A method of operating a base station in a radio access network, the method comprising:
detecting a change in a radio network congestion status associated with downlink traffic of a cell or cell sector of the base station that is being used to serve a mobile device, the change being a change to a given one of a plurality of possible radio congestion levels;
starting a packet modification process to modify one or more packets in each of one or more uplink data flows from the mobile device to a core network of the radio access network, the one or more packets in each of the one or more uplink data flows being modified by the packet modification process to signal, to a server in the core network, the change in congestion status to the given one of the plurality of possible radio congestion levels, wherein the modification of the one or more packets in each of the one or more uplink data flows is by updating a field in an IP packet header of each of the one or more packets to signal in each packet the change in congestion status;
detecting, in each of one or more downlink data flows from the core network to the mobile device, at least one packet which has been modified by the server to indicate an acknowledgement of the signaled change in congestion status; and
stopping the packet modification process in response to detecting the acknowledgement of the change in congestion status.

14. A method of operating a server in a core network of a radio access network, the method comprising:
detecting one or more modified packets in each of one or more uplink data flows from a mobile device to the core network, the one or more uplink data flows being associated with a data session of the mobile device, the one or more modified packets being modified by a base station of a cell or cell sector serving the mobile device by updating a field in an IP packet header of the one or more modified packets to indicate a current radio congestion level associated with the cell or cell sector, as determined by the base station, wherein a plurality of different radio congestion levels are possible;
counting, in at least a first time period, for each of the plurality of possible radio congestion levels, the number of the one or more uplink data flows that indicate that radio congestion level; and declaring, in response to one or more predetermined criteria associated with the count being met, that a congestion level of the data session is at a given one of the possible radio congestion levels.

15. A non-transitory computer readable storage medium comprising a set of computable readable instructions stored thereon, which, when executed by a processing system at a base station in a radio access network causes the system to:
    detect a change in a radio network congestion status associated with downlink traffic of a cell or cell sector of the base station that is being used to serve a mobile device, the change being a change to a given one of a plurality of possible radio congestion levels;
    start a packet modification process to modify one or more packets in each of one or more uplink data flows from the mobile device to a core network of the radio access network, the one or more packets in each of the one or more uplink data flows being modified by the packet modification process to signal, to a server in the core network, the change in congestion status to the given one of the plurality of possible radio congestion levels, wherein the modification of the one or more packets in each of the one or more uplink data flows is by updating a field in an IP packet header of each of the one or more packets to signal in each packet the change in congestion status;
    detect, in each of one or more downlink data flows from the core network to the mobile device, at least one packet which has been modified by the server to indicate an acknowledgement of the signaled change in congestion status; and
    stop the packet modification process in response to detecting the acknowledgement of the change in congestion status.

16. A non-transitory computer readable storage medium comprising a set of computable readable instructions stored thereon, which, when executed by a processing system of a server in a core network of a radio access network causes the system to:
    detect one or more modified packets in each of one or more uplink data flows from a mobile device to the core network, the one or more uplink data flows being associated with a data session of the mobile device, the one or more modified packets being modified by a base station of a cell or cell sector serving the mobile device by updating a field in an IP packet header of the one or more modified packets to indicate a current radio congestion level associated with the cell or cell sector, as determined by the base station, wherein a plurality of different radio congestion levels are possible;
    count, in at least a first time period, for each of the plurality of possible radio congestion levels, the number of the one or more uplink data flows that indicate that radio congestion level; and
    declare, in response to one or more predetermined criteria associated with the count being met, that a congestion level of the data session is at a given one of the possible radio congestion levels.

* * * * *